(12) United States Patent  
Lin et al.

(10) Patent No.: US 8,981,230 B2
(45) Date of Patent: Mar. 17, 2015

(54) ELECTRONIC APPARATUS AND TOUCH COVER

(75) Inventors: Ming-Tien Lin, Taoyuan County (TW); Weng-Chang Shen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 133 days.

(21) Appl. No.: 13/556,199

(22) Filed: Jul. 24, 2012

(65) Prior Publication Data

US 2014/0027260 A1 Jan. 30, 2014

(51) Int. Cl.
*H03K 17/975* (2006.01)
*G06F 1/16* (2006.01)
*G06F 3/041* (2006.01)

(52) U.S. Cl.
CPC ............ *G06F 1/1656* (2013.01); *G06F 1/1626* (2013.01); *G06F 1/1643* (2013.01); *G06F 3/041* (2013.01); *G06F 2203/04107* (2013.01); *Y10T 29/49105* (2013.01)
USPC ........... 174/157; 200/600; 361/728; 349/149; 349/150; 349/152; 345/173

(58) Field of Classification Search
CPC ........... H01L 2924/01079; H01L 2924/01078; H01L 2224/16; H01L 2924/01029; H01L 2924/15311; H03K 17/962; H03K 17/975; H03K 2217/960755; H03K 2017/9602; H01H 2239/006; H01H 1/5805; H05K 1/0215; H05K 1/0219; H05K 1/0259; H05K 9/0079; H05K 1/0296

USPC .......................................... 200/600; 361/728
See application file for complete search history.

(56) References Cited

U.S. PATENT DOCUMENTS

| | | | |
|---|---|---|---|
| 6,280,552 B1 | 8/2001 | Bottari | |
| 7,122,757 B2 * | 10/2006 | Lee et al. | 200/600 |
| 7,884,808 B2 * | 2/2011 | Joo | 345/173 |
| 2008/0223708 A1 * | 9/2008 | Joo | 200/600 |
| 2009/0090000 A1 * | 4/2009 | Su et al. | 29/832 |
| 2010/0066683 A1 | 3/2010 | Chang et al. | |
| 2010/0103138 A1 | 4/2010 | Huang et al. | |

FOREIGN PATENT DOCUMENTS

| | | |
|---|---|---|
| TW | 200427014 | 12/2004 |
| TW | 200917109 | 4/2009 |
| TW | M393740 | 12/2010 |

OTHER PUBLICATIONS

"Office Action of Taiwan Counterpart Application", issued on Nov. 27, 2014, p. 1-6.

* cited by examiner

*Primary Examiner* — Timothy Thompson
*Assistant Examiner* — Michael F McAllister
(74) *Attorney, Agent, or Firm* — Jianq Chyun IP Office

(57) ABSTRACT

A touch cover including a substrate, a sensing circuit and a grounding circuit is provided. The substrate has an inner plane and an inner side surface extending from the inner plane. The inner plane and the inner side surface are not coplanar. The sensing circuit is disposed on the inner plane. At least a portion of the grounding circuit is disposed on the inner side surface. An electronic apparatus with the touch cover and a fabricating method of the touch cover are also provided.

16 Claims, 7 Drawing Sheets

ELECTRONIC APPARATUS AND TOUCH COVER

BACKGROUND OF THE INVENTION

1. Field of the Invention

The invention relates to an electronic apparatus, and more particularly, to an electronic apparatus having a touch cover.

2. Description of Related Art

In current information era, human beings by degrees tend to rely on consumer electronic products. The consumer electronic products such as mobile phones, personal digital assistants (PDAs) and tablet PCs are commonly seen everywhere and have become inseparable from modern life. Input devices of the products have been changed from conventional keyboards and mice to touch covers so as to achieve the goals of convenience, miniaturization, and user-friendliness.

FIG. 1 is a schematic view of a conventional touch cover. In a conventional touch cover 10, in order to prevent electromagnetic interference (EMI) or electrostatic discharge (ESD) from affecting operation of an electronic apparatus, a grounding circuit is often disposed around a sensing circuit in the circuit layout of the touch cover of the electronic apparatus for protection purposes. In the touch cover 10, a sensing circuit 14 and a grounding circuit 16 are both disposed on a flexible substrate 18 first, and the flexible substrate 18 is then attached to an inner plane 12a of a substrate 12. As a result, an area required for the inner plane 12a on the touch cover 10 cannot be reduced. Accordingly, a width of the touch cover 10 is increased.

SUMMARY OF THE INVENTION

The invention provides a touch cover having a grounding circuit disposed on an inner side surface of a three-dimensional side.

The invention provides a fabricating method of a touch cover. The method is suitable for fabricating the aforementioned touch cover.

The invention provides an electronic apparatus having a narrowed edge width.

The invention proposes a touch cover including a substrate, a sensing circuit and a grounding circuit. The substrate has an inner plane and an inner side surface extending from the inner plane. The inner plane and the inner side surface are not coplanar. The sensing circuit is disposed on the inner plane. At least a portion of the grounding circuit is disposed on the inner side surface.

The invention proposes an electronic apparatus including a main body, a display module and a touch cover. The display module is disposed between the main body and the touch cover. The touch cover includes a substrate, a sensing circuit and a grounding circuit. The substrate has an inner plane and an inner side surface extending from the inner plane. The inner plane and the inner side surface are not coplanar. The sensing circuit is disposed on the inner plane. At least a portion of the grounding circuit is disposed on the inner side surface.

The invention provides a fabricating method of a touch cover. The method includes shaping a substrate so that the substrate has an inner plane and an inner side surface extending from the inner plane, wherein the inner plane and the inner side surface are not coplanar. A conductor layer is formed all over the inner plane and the inner side surface of the substrate. The conductor layer is patterned to form a sensing circuit on the inner plane and to form at least a portion of a grounding circuit on the inner side surface.

In an embodiment of the invention, the substrate is a glass substrate.

In an embodiment of the invention, the inner side surface is a plane surface or a curved surface.

In an embodiment of the invention, the sensing circuit has sensing pads arranged in an array on the inner plane.

In an embodiment of the invention, the grounding circuit is disposed along an edge of the substrate.

In an embodiment of the invention, the touch cover further includes a flexible printed circuit (FPC) electrically connected with the grounding circuit and the sensing circuit.

In an embodiment of the invention, materials of the sensing circuit and the grounding circuit are the same.

In an embodiment of the invention, the touch cover further includes a light-shielding layer disposed on the inner plane and the inner side surface. The light-shielding layer covers the grounding circuit.

In an embodiment of the invention, the fabricating method of the touch cover further includes cutting the substrate from a mother substrate before shaping the substrate.

In an embodiment of the invention, the fabricating method of the touch cover further includes performing a chemical strengthening process on the shaped substrate after shaping the substrate and before forming the conductor layer.

In an embodiment of the invention, the step of patterning the conductor layer is patterning the conductor layer by a laser, and a beam diameter of the laser is 30 μm.

In an embodiment of the invention, the fabricating method of the touch cover further includes disposing a light-shielding layer on the inner plane and the inner side surface after patterning the conductor layer. The light-shielding layer covers the grounding circuit.

Based on the above, the touch cover of the invention is designed to have the appearance of a three-dimensional structure. Moreover, the grounding circuit is disposed on the inner side surface which is not coplanar with the inner plane of a display area, thereby decreasing the edge width of the touch cover outside a touch display area and contributing significantly to a decrease in width of the electronic apparatus.

To make the aforementioned features and advantages of the invention more comprehensible, embodiments accompanied with figures are described in detail below.

DESCRIPTION OF EMBODIMENTS

Figure 2A:
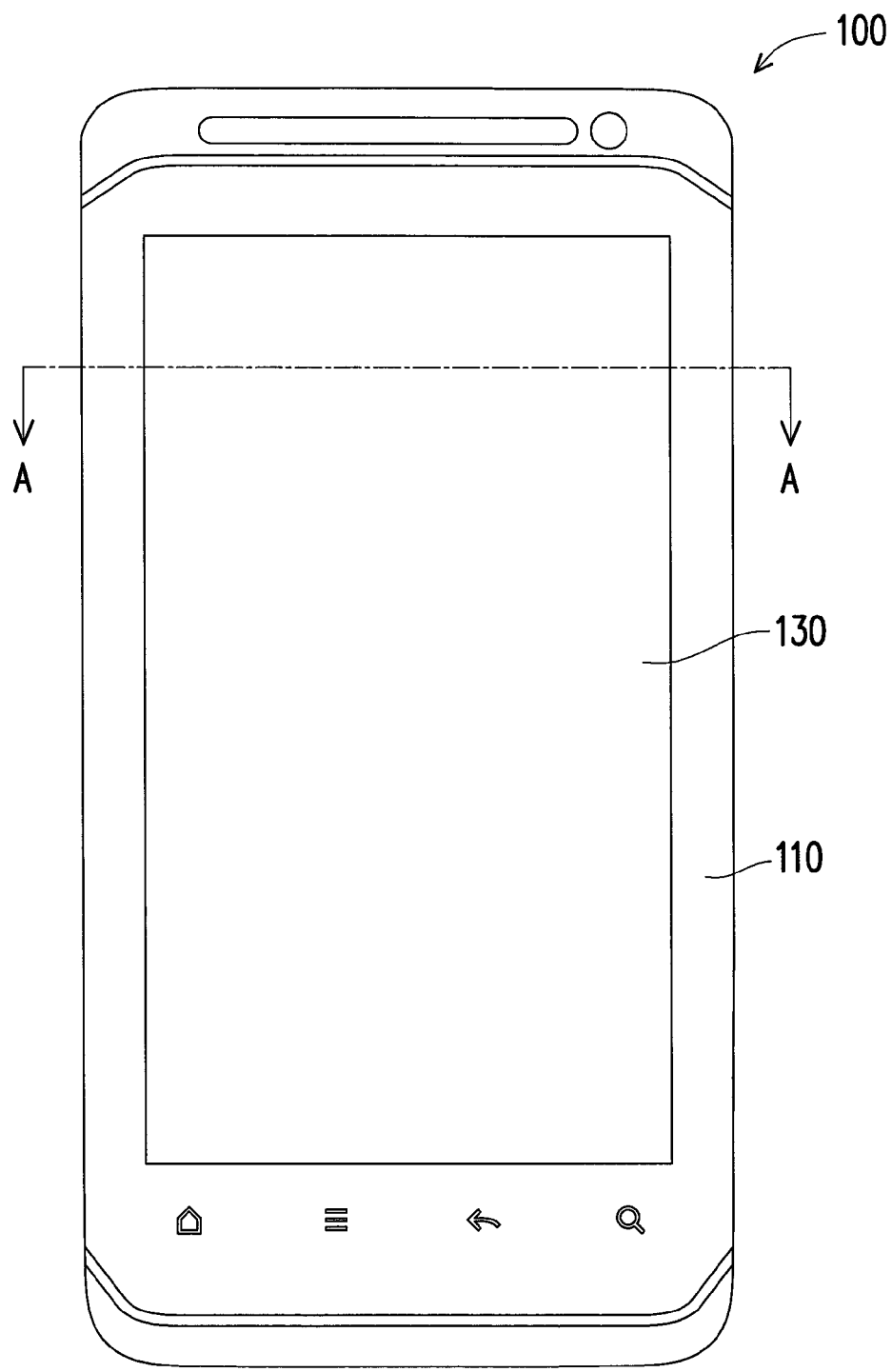
FIG. 2A is a front view of an electronic apparatus according to an embodiment of the invention.
Figure 2B:
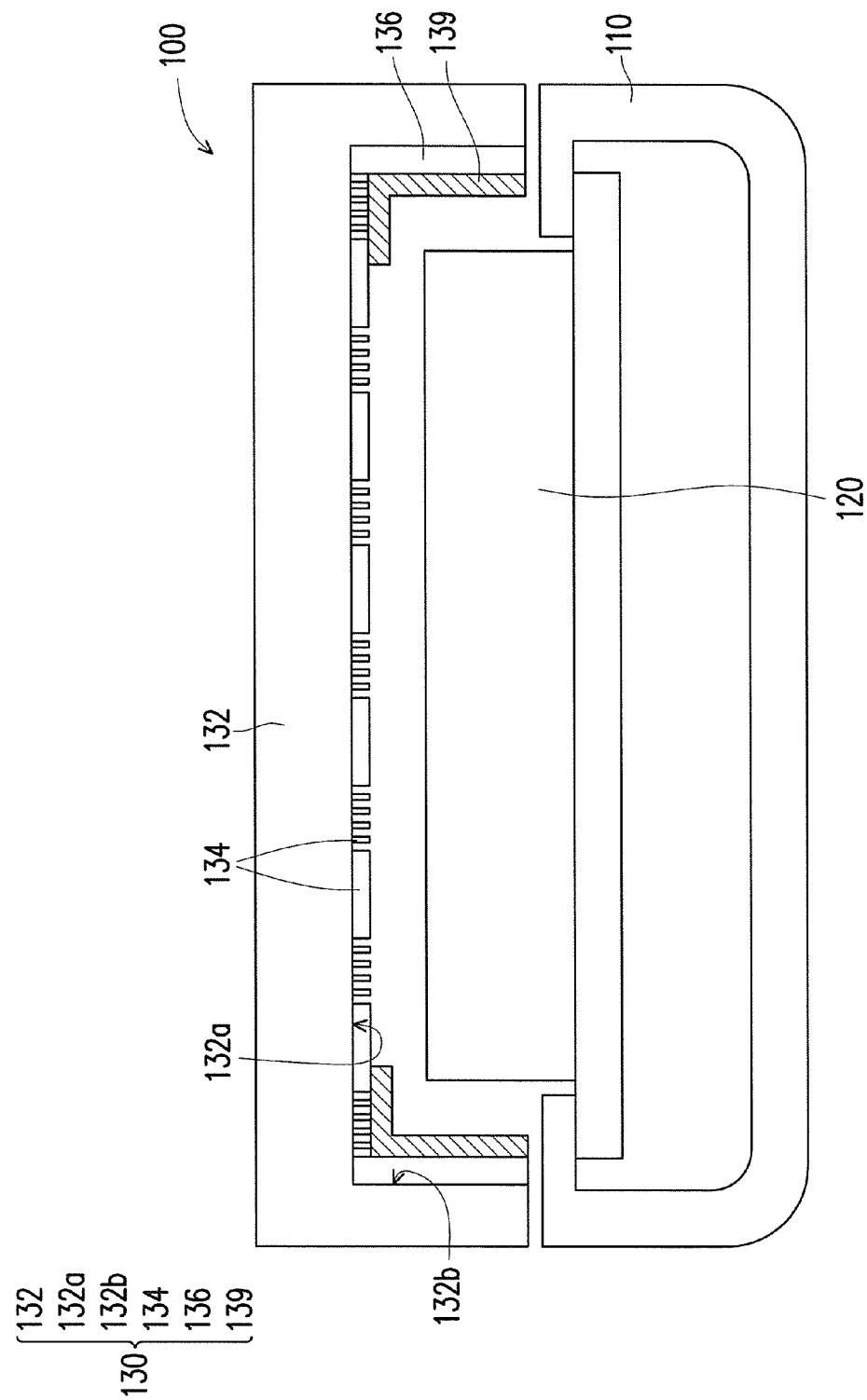
FIG. 2B is a cross-sectional view of the electronic apparatus depicted in FIG. 2A along a sectional line A-A.

FIG. 2A is a front view of an electronic apparatus according to an embodiment of the invention. FIG. 2B is a cross-sectional view of the electronic apparatus depicted in FIG. 2A along a sectional line A-A. Referring to FIG. 2A and FIG. 2B, an electronic apparatus 100 of the invention includes a main body 110, a display module 120 and a touch cover 130. The display module 120 is disposed between the main body 110 and the touch cover 130. The touch cover 130 includes a substrate 132, a sensing circuit 134 and a grounding circuit 136. The substrate 132 has an inner plane 132a and an inner side surface 132b extending from the inner plane 132a. The inner plane 132a and the inner side surface 132b are not coplanar. The sensing circuit 134 is disposed on the inner plane 132a and at least a portion of the grounding circuit 136 is disposed on the inner side surface 132b. In other words, the grounding circuit 136 may also be partially disposed on the inner plane 132a. In other embodiments, the grounding circuit may be completely disposed on the inner side surface of the substrate.

Figure 1:
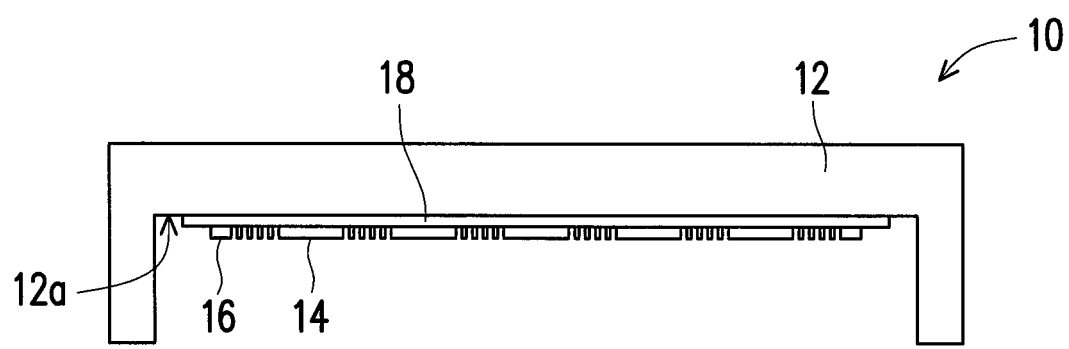
FIG. 1 is a schematic view of a conventional touch cover.

In the cross-sectional view of FIG. 2B, the inner plane 132a and the inner side surface 132b of the substrate 132 are not coplanar. Specifically speaking, the touch cover 130 is a three-dimensional structure. The inner plane 132a of the substrate 132 is parallel with the display module 120, and the sensing circuit 134 is disposed on the inner plane 132a. In this embodiment, a portion of the grounding circuit 136 is disposed on the inner side surface 132b, so as to reduce the space reserved for disposing the grounding circuit 136 on the inner plane 132a of the touch cover 130. Therefore, compared to the touch cover 10 in FIG. 1, the touch cover 130 in FIG. 2B reduces not only a spacing (e.g. 0.1 mm) between an edge of the sensing circuit 134 and an edge of the inner plane 132a, but also a width of the electronic apparatus 100.

In this embodiment, the substrate 132 of the touch cover 130 is a glass substrate. The glass substrate is, for example, soda lime glass. The inner plane 132a of the touch cover 130 is designed as a plane surface or a curved surface depending on the appearance of the electronic apparatus 100. However, the invention does not limit the material of the substrate 132 and the appearance of the inner side surface 132b of the substrate 132. The inner side surface 132b in this embodiment is shown as a plane surface for schematic purposes. In addition, a light-shielding layer 139 is further included on the inner plane 132a and the inner side surface 132b of the touch cover 130, as shown in FIG. 2B. The light-shielding layer 139 is disposed on the inner plane 132a and the inner side surface 132b and covers the grounding circuit 136. By disposing the light-shielding layer 139, the touch cover 130 is equipped with an opaque edge which is visible externally and covers an assembly structure of the touch cover 130 and the main body 110 to maintain a beautiful external appearance.

Figure 3:
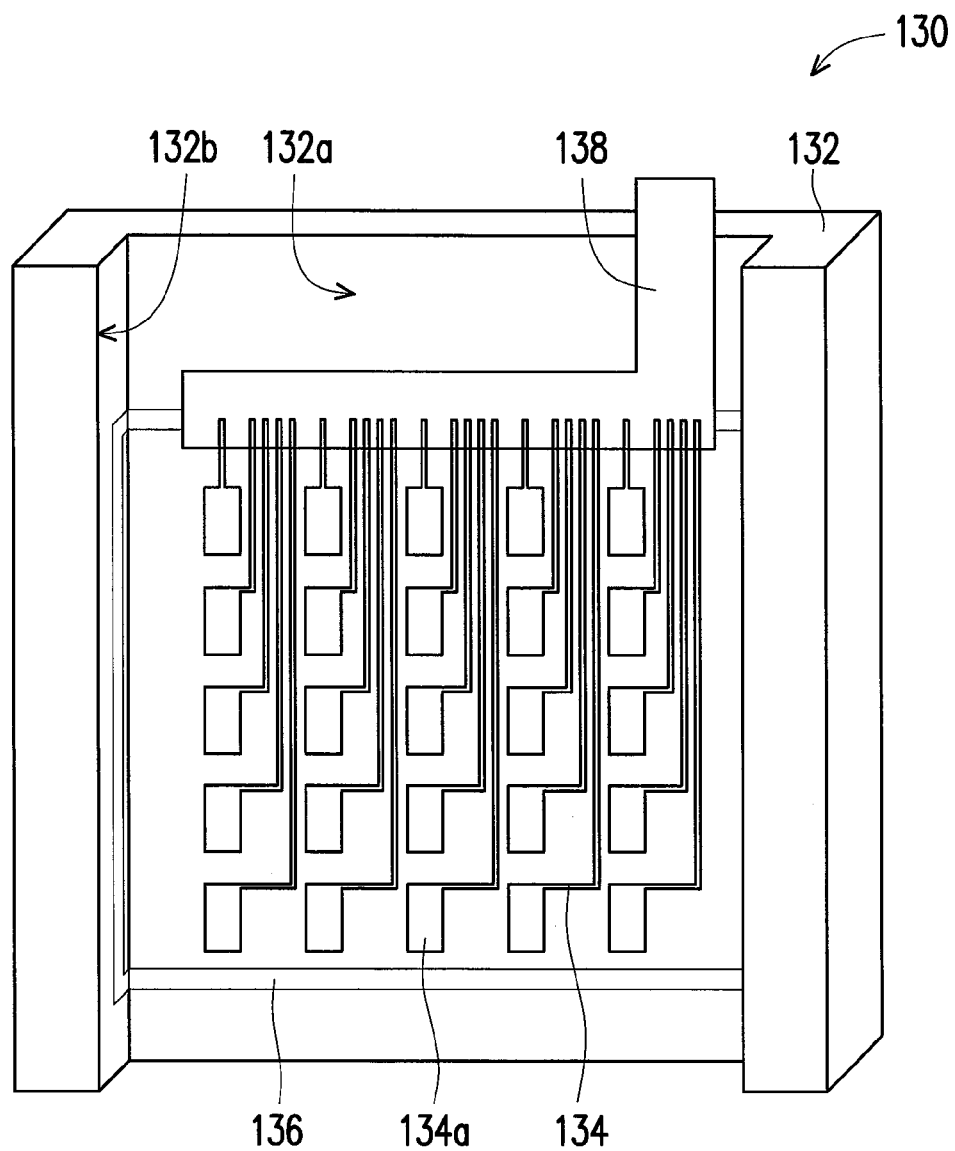
FIG. 3 is a schematic back view of the touch cover depicted in FIG. 2A.

FIG. 3 is a schematic back view of the touch cover depicted in FIG. 2A. Referring to FIG. 3, in this embodiment, the touch cover 130 has a single-layer sensing circuit 134. The sensing circuit 134 has a plurality of sensing pads 134a, the sensing pads 134a being arranged in an array on the inner plane 132a. The sensing pads 134a arranged in an array are distributed over a display area of the touch cover 130. When a user touches the touch cover 130 in accordance with patterns showed on the display module 120 in order to operate the electronic apparatus 100, the sensing pads 134a sense and generate a signal, which is transmitted to the main body 110 via the sensing circuit 134 (as shown in FIG. 2B). The grounding circuit 136 is disposed around the sensing circuit 134. In this embodiment, the grounding circuit 136 and the sensing circuit 134 have the same material.

When there is electromagnetic interference or static electricity (such as the static electricity generated when a protection film is detached from the touch cover 130) around the electronic apparatus 100, the grounding circuit 136 protects the sensing circuit 134 from interference or damage by the static electricity. In addition, in this embodiment, the touch cover 130 has a flexible printed circuit (FPC) 138. The grounding circuit 136 and the sensing circuit 134 are electrically connected onto the FPC 138, and the touch cover 130 is electrically connected with the main body 110 via the FPC 138. However, the invention neither limits the forms of the sensing circuit and the grounding circuit of the touch cover, nor limits the manner of electrical connection between the touch cover and the main body.

Figure 4A:
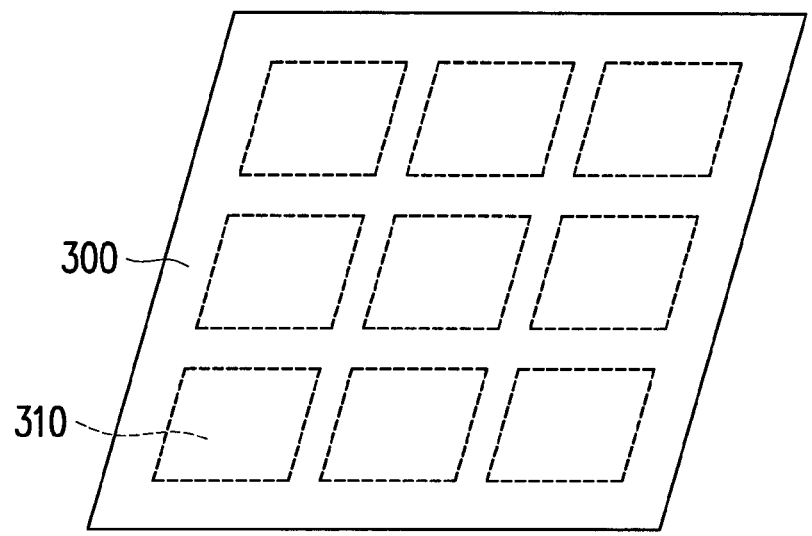
FIG. 4A to FIG. 4F illustrate a fabricating method of the touch cover depicted in FIG. 2A.
Figure 4B:
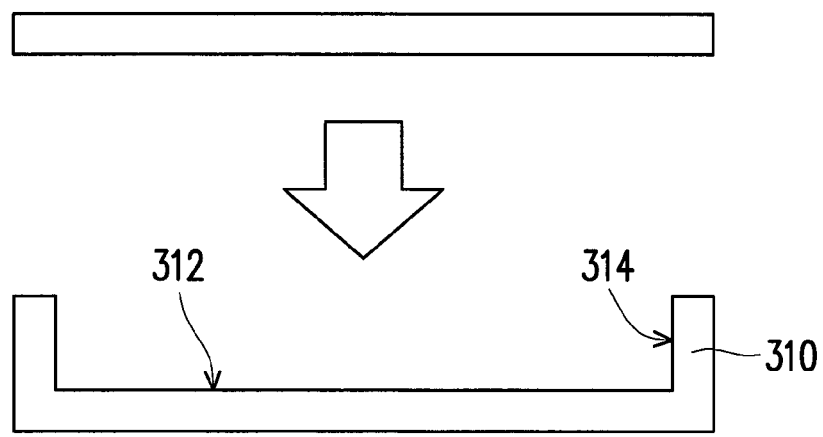
Figure 4C:
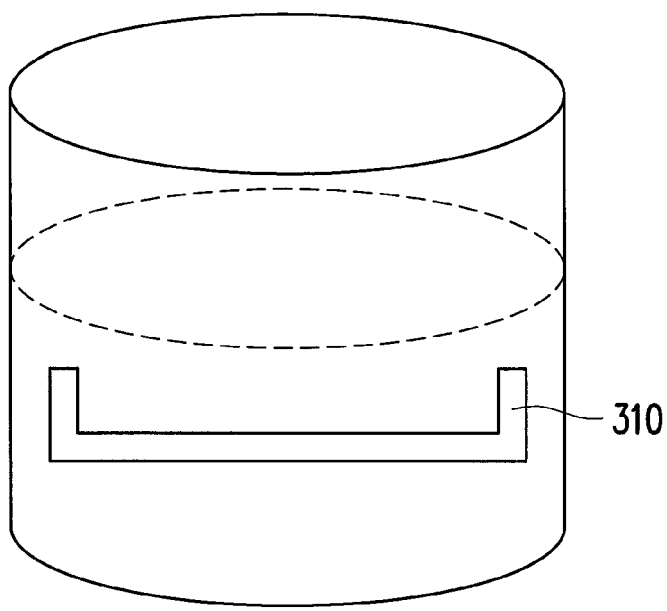
Figure 4D:
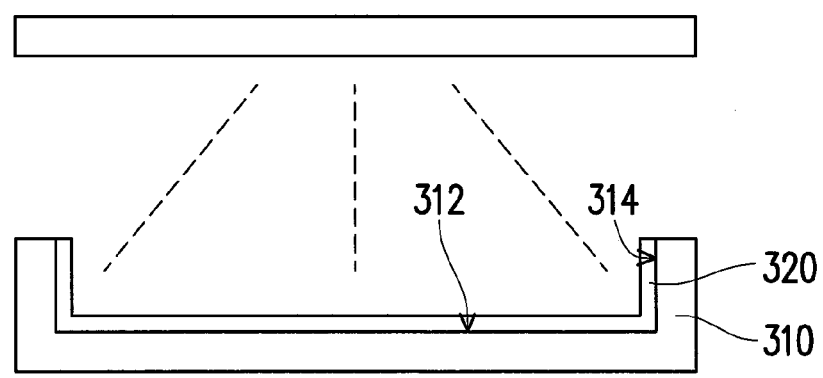
Figure 4E:
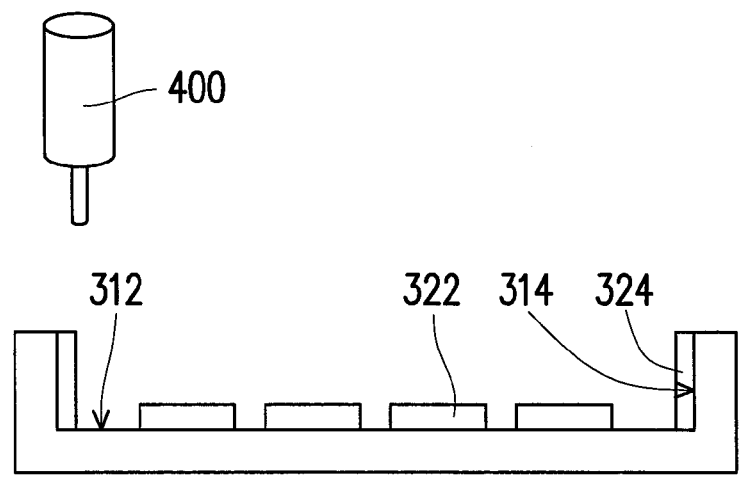

FIG. 4A to FIG. 4F illustrate a fabricating method of the touch cover depicted in FIG. 2A. The fabricating method of the touch cover 130 in the aforementioned embodiment includes the following steps. As shown in FIG. 4B, a substrate 310 is shaped to have an inner plane 312 and an inner side surface 314 extending from the inner plane 312, wherein the inner plane 312 and the inner side surface 314 are not coplanar. Next, as shown in FIG. 4D, a conductor layer 320 is formed all over the inner plane 312 and the inner side surface 314 of the substrate 310. The conductor layer 320 is formed by vapor deposition or sputtering, and the invention is not limited thereto. Next, as shown in FIG. 4E, the conductor layer 320 is patterned to form a sensing circuit 322 on the inner plane 312 and to form at least a portion of a grounding circuit 324 on the inner side surface 314.

By utilizing the aforementioned methods, at least a portion of the grounding circuit 324 is formed on the inner side surface 314 of the substrate 310 to reduce an area of the inner plane 312 of the substrate 310, and further, to reduce an area of the whole touch cover 130.

Figure 4F:
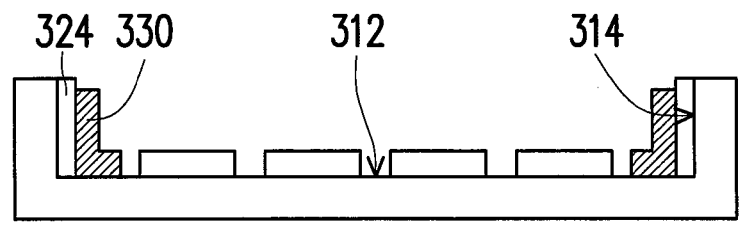

Before the substrate 310 is shaped, a plurality of the substrates 310 are selectively cut from a mother substrate 300, as shown in FIG. 4A. The cutting is, for example, done by a grinder. Alternatively, the plurality of the substrates 310 may be broken off from the mother substrate 300 after a V-shaped notch is created on a surface of the mother substrate 300. The invention is not limited thereto. After the substrate 310 is shaped into a three-dimensional shape, a chemical strengthening process is performed thereon as shown in FIG. 4C. Mechanical properties of the substrates 310 are strengthened by a soaking treatment in chemicals, so that growth of microcracks caused on the substrates 310 being cut from the mother substrate 300 is reduced, and thus fracture will not occur during subsequent processes or during the use. In addition, in the step of FIG. 4E, the conductor layer 320 is patterned by, for example, a laser 400. A beam diameter of the laser 400 is, for example, 30 μm. The beam diameter of the laser 400 determines the minimum distance between lines in the sensing circuit 322. Moreover, a smaller beam diameter of the laser 400 increases a utilization rate of the conductor layer 320. In addition, during the patterning process of the conductor layer 320 using the laser 400, the substrate 310 is fixed by a fixture, and an orientation of the substrate 310 on the fixture is adjusted depending on an orientation of a surface requiring patterning. Accordingly, skewness or imprecision of circuit after the patterning as a result of accumulation of process tolerance in manufacture is decreased. The invention neither limits the method for patterning the conductor layer by laser nor limits the diameter of the laser. In addition, after the conductor layer 320 is patterned, a light-shielding layer 330 is disposed on the inner plane 312 and the inner side surface 314, as shown in FIG. 4F. The light-shielding layer 330 covers the grounding circuit 324 to provide the touch cover 130 with a beautiful external appearance. The light-shielding layer 330 is disposed by, for example, a screen-printing method.

In summary, the touch cover of the invention is designed to have the appearance of a three-dimensional structure. The sensing circuit is disposed on the inner plane of the touch cover, while the grounding circuit is disposed on the inner side surface which is not coplanar with the inner plane. Accordingly, the chance that electromagnetic interference or static electricity affects the sensing circuit is reduced. Moreover, the edge width of the touch cover outside the touch display area is decreased, which contributes significantly to a decrease in width of the electronic apparatus. In addition, the fabricating method of a touch cover provided in the invention is suitable for fabricating the touch cover having the aforementioned features.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A touch cover, comprising:
    a substrate having an inner plane and an inner side surface extending from the inner plane, wherein the inner plane and the inner side surface are not coplanar;
    a sensing circuit disposed on the inner plane; and
    a grounding circuit, wherein the grounding circuit is completely disposed on the inner side surface.

2. The touch cover as claimed in claim 1, wherein the substrate is a glass substrate.

3. The touch cover as claimed in claim 1, wherein the inner side surface is a plane surface or a curved surface.

4. The touch cover as claimed in claim 1, wherein the sensing circuit has a plurality of sensing pads arranged in an array on the inner plane.

5. The touch cover as claimed in claim 1, wherein the grounding circuit is disposed along an edge of the substrate.

6. The touch cover as claimed in claim 1, further comprising a flexible printed circuit (FPC) electrically connected with the grounding circuit and the sensing circuit.

7. The touch cover as claimed in claim 1, wherein materials of the sensing circuit and the grounding circuit are the same.

8. The touch cover as claimed in claim 1, further comprising a light-shielding layer disposed on the inner plane and the inner side surface and covering the grounding circuit.

9. An electronic apparatus, comprising:
    a main body;
    a display module;
    a touch cover, wherein the display module is disposed between the main body and the touch cover, the touch cover comprising:
    a substrate having an inner plane and an inner side surface extending from the inner plane, wherein the inner plane and the inner side surface are not coplanar;
    a sensing circuit disposed on the inner plane; and
    a grounding circuit, wherein the grounding circuit is completely disposed on the inner side surface.

10. The electronic apparatus as claimed in claim 9, wherein the substrate is a glass substrate.

11. The electronic apparatus as claimed in claim 9, wherein the inner side surface is a plane surface or a curved surface.

12. The electronic apparatus as claimed in claim 9, wherein the sensing circuit has a plurality of sensing pads arranged in an array on the inner plane.

13. The electronic apparatus as claimed in claim 9, wherein the grounding circuit is disposed along an edge of the substrate.

14. The electronic apparatus as claimed in claim 9, further comprising a flexible printed circuit (FPC) electrically connected with the grounding circuit and the sensing circuit.

15. The touch cover as claimed in claim 9, wherein materials of the sensing circuit and the grounding circuit are the same.

16. The touch cover as claimed in claim 9, further comprising a light-shielding layer disposed on the inner plane and the inner side surface and covering the rounding circuit.

* * * * *